Figure 1:
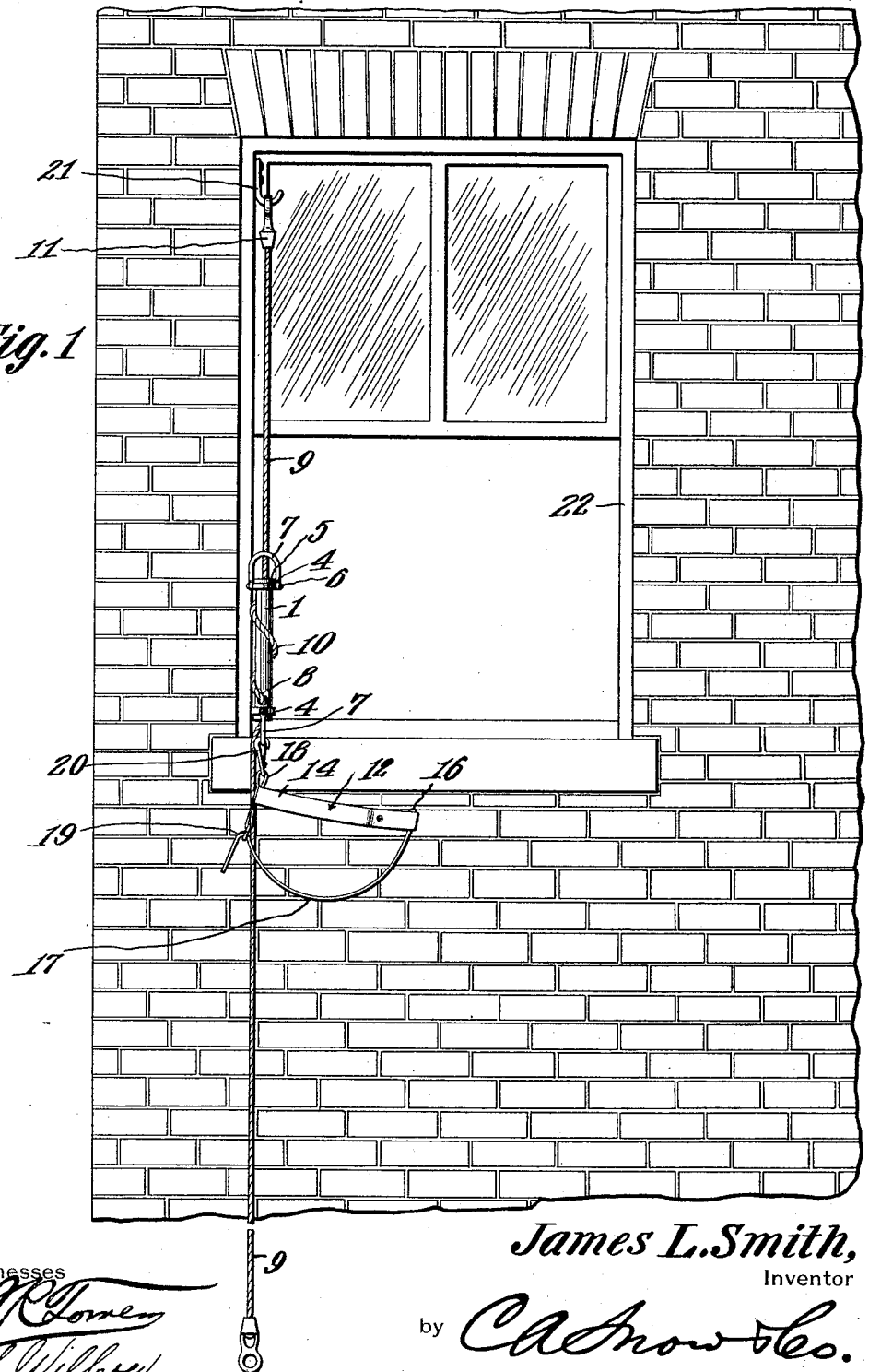

J. L. SMITH.
FIRE ESCAPE.
APPLICATION FILED MAR. 23, 1914.

1,115,603.

Patented Nov. 3, 1914.
2 SHEETS—SHEET 1.

James L. Smith,
Inventor

Witnesses by C. A. Snow & Co.
Attorneys

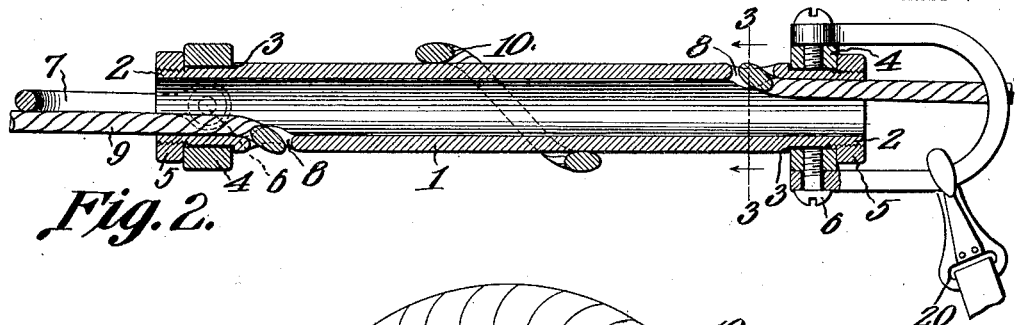
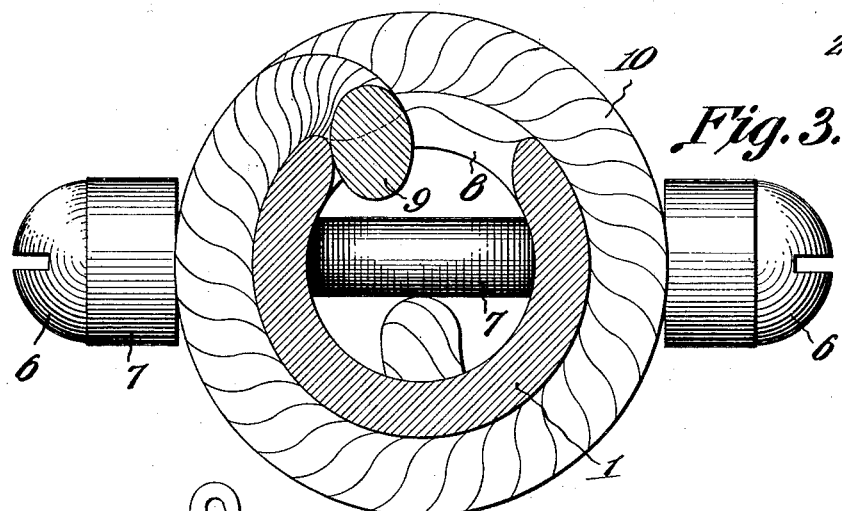
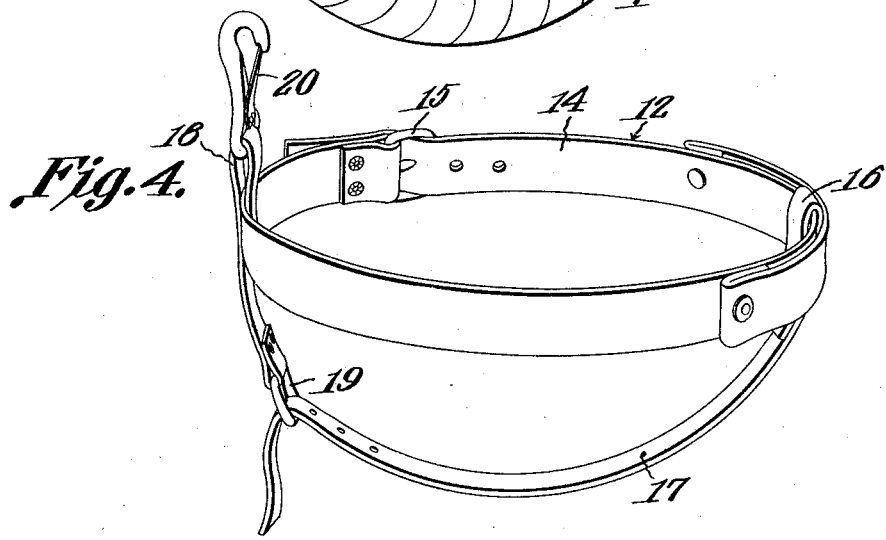

UNITED STATES PATENT OFFICE.

JAMES L. SMITH, OF PRINCETON, INDIANA.

FIRE-ESCAPE.

1,115,603. Specification of Letters Patent. Patented Nov. 3, 1914.

Application filed March 23, 1914. Serial No. 826,721.

*To all whom it may concern:*

Be it known that I, JAMES L. SMITH, a citizen of the United States, residing at Princeton, in the county of Gibson and State of Indiana, have invented a new and useful Fire-Escape, of which the following is a specification.

The device forming the subject matter of this application is a fire escape, and one object of the present invention is to provide a device of this type in which the flexible element may be reversed readily, end for end, so that a sliding friction member, mounted to move on the flexible element and carrying a support need not be returned idly along the flexible element each time that a person desires to descend.

Another object of the invention is to provide the friction member and so construct the same that the rate of descent may be regulated.

Another object of the invention is to provide a novel form of reversible friction member.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows the invention in elevation, applied to a building; Fig. 2 is a longitudinal section of the friction member; Fig. 3 is a transverse section of the friction member on the line 3—3 of Fig. 2; Fig. 4 is a perspective depicting the support.

In carrying out the invention there is provided a friction member denoted generally by the numeral 1 and shown most clearly in Fig. 2 of the drawings, the friction member 1 preferably being in the form of a tube, which may be made of aluminum or other light material for the sake of portability. The friction member 1 is provided with reduced ends 2 defining shoulders 3. Nuts 5 are threaded onto the extremities of the friction member 1 and between the nuts 5 and the shoulders 3 collars 4 are journaled. Pivot elements 6, which may be screws, enter opposed portions of the collars 4, the pivot elements 6 being connected to clevises 7. The collars 4 and the clevises 7 may be described as swivels journaled for rotation on the ends of the friction member 1. Adjacent its ends the friction member 1 is equipped with openings 8 which may be located in diagonally disposed relation with each other as Fig. 2 will most clearly show. A flexible element 9 which may be a rope, is provided. The flexible element 9 passes into the bore of the friction member 1 at one end thereof, and then passes outwardly through one of the openings 8, the intermediate portion of the flexible element 9 being wrapped as indicated at 10 around the exterior of the friction member 1, the flexible element thence being carried inwardly through the other opening 8 into the bore of the friction member 1 and passing out of the friction member at the extremity thereof; all of which will be clearly understood from Fig. 2.

The flexible element 9 may be wrapped any desired number of times around the outside of the friction member 1 and in this way, the rate of descent may be regulated and adjusted. Any suitable means may be provided for connecting either end of the flexible element 9 with an overhead support. If desired, eyes 11 may be rotatably held upon the ends of the flexible element 9, as indicated in Fig. 1. One of these eyes 11 may be connected with a hook 21 located upon the side portion of the window frame 22 or elsewhere, but if no hook 21 is present, it is obvious that the upper end of the flexible element 9 may be extended through the window and be tied or secured to any object inside of the building.

The invention includes a support or harness 12 which may be of any form, the harness being shown most clearly in Fig. 4. The support may comprise a belly band 14 in which is interposed a buckle 15. One end of a perineal strap 17 is looped as shown at 16 around the belly band 14, the other end of the strap 17 terminating in a loop 18 which also incloses the belly band. A buckle 19 may be interposed in the strap 17 and a securing device, such as a snap 20, may be connected with the loop 18.

In practical operation, presupposing that the flexible element 9 is mounted on the building by means of the hook 21 or in any other appropriate manner, the belly band 14 engaged around the body of the user and the perineal strap 17 occupies its obvious position. The snap 20 is then engaged in one of the clevises 17 as shown in Fig. 1. The lower, depending end of the flexible element 9 may be bent upwardly across the lower end of the friction tube 1 and thus be held by one hand of the operator, the other hand of the operator grasping the friction tube 1 and holding the wrapped portion 10 of the flexible element closely thereagainst. In this manner the speed of descent is regulated.

After one person has descended, another person desiring to use the device hauls the flexible element 9 up until the friction member 1 is within reach. Then the flexible element 9 is turned end for end, to avoid sliding the friction member 1 the full length of the flexible element 9 with a corresponding loss of time. The snap 20 upon the support 12 is then unhooked from the clevis 7 at one end of the friction member 1 and is connected with the clevis 7 on the other end of the friction member, whereupon the device is in condition for further use.

Summed up briefly, the operation of the structure is as follows:—After the device has been used once, the flexible element 9 is drawn up and turned end for end, and the harness or support 12 is unhooked from one end of the tube 1 and is hooked onto the other end of the tube.

Having thus described the invention, what is claimed is:—

A fire escape embodying a tube having openings in its side wall adjacent its ends; a flexible element wound about the outside of the tube and having its ends extended inwardly through the openings into the tube and outwardly through the ends of the tube; collars journaled on the ends of the tube; bails pivoted to the collars; securing rings on the ends of the tube and coacting with the collars, the ends of the tube being disposed between the securing rings and the flexible element; the tube being provided with shoulders located between the collars and the openings and constituting means for holding the collars spaced from the openings.

In testimony that I claim the foregoing as my own, I have hereto affixed my signature in the presence of two witnesses.

JAMES L. SMITH.

Witnesses:
CARYL V. RICE,
H. E. HATCH.

---

Copies of this patent may be obtained for five cents each, by addressing the "Commissioner of Patents, Washington, D. C."